(12) United States Patent
King, Jr.

(10) Patent No.: US 11,383,339 B2
(45) Date of Patent: Jul. 12, 2022

(54) SYSTEM AND METHODS FOR LOOSE DEBRIS CHIP SHIELDING

(71) Applicant: SKITTER & SQUIRT ADVENTURES, LLC, Missoula, MT (US)

(72) Inventor: Jack M. King, Jr., Tempe, AZ (US)

(73) Assignee: SKITTER & SQUIRT ADVENTURES, LLC, Missoula, MT (US)

( * ) Notice: Subject to any disclaimer, the term of this patent is extended or adjusted under 35 U.S.C. 154(b) by 0 days.

(21) Appl. No.: 16/218,682

(22) Filed: Dec. 13, 2018

(65) Prior Publication Data

US 2020/0189058 A1 Jun. 18, 2020

(51) Int. Cl.
*B23Q 11/00* (2006.01)
*A47L 7/00* (2006.01)

(52) U.S. Cl.
CPC ...... *B23Q 11/0046* (2013.01); *B23Q 11/0071* (2013.01); *A47L 7/009* (2013.01); *B25D 2217/0065* (2013.01); *B25D 2222/03* (2013.01); *B25D 2222/72* (2013.01)

(58) Field of Classification Search
CPC ........................ B23Q 11/0046; B23Q 11/0071
See application file for complete search history.

(56) References Cited

U.S. PATENT DOCUMENTS

| | | | | |
|---|---|---|---|---|
| 6,299,393 | B1* | 10/2001 | Anders | B23F 17/003 409/131 |
| 6,648,742 | B1* | 11/2003 | Segiel, Jr. | B23Q 11/0046 30/124 |
| 8,061,344 | B2* | 11/2011 | Dofher | B28D 7/02 125/13.01 |
| 8,381,711 | B2* | 2/2013 | Loveless | B23D 59/006 125/13.01 |
| 2011/0179923 | A1* | 7/2011 | Tsuda | B23D 59/006 83/100 |
| 2018/0056464 | A1* | 3/2018 | Witter | B23Q 11/0046 |
| 2018/0117723 | A1* | 5/2018 | Boswell | B23Q 11/0046 |
| 2018/0125313 | A1* | 5/2018 | King, Jr. | B23Q 11/0046 |

* cited by examiner

*Primary Examiner* — Anna K Kinsaul
*Assistant Examiner* — Daniel Jeremy Leeds
(74) *Attorney, Agent, or Firm* — Lisa Foundation Patent Law Clinic at Arizona State University (57) ABSTRACT

Methods and devices relating to loose debris chip shielding for dust free tile removal and ordinary tile removal projects. During the tile removal process, a chipping hammer powers a chipping hammer blade that breaks up tiles into pieces. The larger, heavier pieces are simply pushed away, but smaller debris chips break off with enough force to send them flying up in the air and in different directions landing in undesirable locations. The methods and devices herein protect equipment, environments, and individuals from damage caused by loose debris chips during tile removal. A shield with several degrees of freedom moves freely in response to chipping hammer vibrations and blocks loose flying debris chips, deflecting them toward the ground.

12 Claims, 8 Drawing Sheets

SYSTEM AND METHODS FOR LOOSE DEBRIS CHIP SHIELDING

BACKGROUND

1. Field of the Invention

The inventions described herein generally pertain to the field of tile removal and more generally to the manner of making and using such methods, devices, or components thereof.

2. Description of Related Art

During the tile removal process, tiles are broken up into pieces. The larger, heavier pieces are simply pushed away, but smaller debris chips break off with enough force to send them flying up in the air and in different directions. These debris chips can embed into a variety of items and environments in the room the tile is being removed in.

These debris chips are harmful to the homes or businesses the tiles are being removed from and to the workers removing the tiles. Loose debris chips can puncture the skin or unprotected eyes, and can pierce walls, counters, shelves, or most anything else in the room. Furthermore the debris, after flying, is left where it lands causing filth and sharp debris in the area that later needs to be cleaned up.

Current workers who are engaging in tile removal are covering an area over the chipping hammer blade to block the flying debris chips with their hands, which requires arching their back in an awkward and uncomfortable position that may cause long term back problems over the years. Furthermore, once the worker becomes fatigued they are less likely to be consistent with keeping their hands covering the area over the chipping hammer blade and are therefore only be able to block a very limited number of flying debris chips.

So as to reduce the complexity and length of the Detailed Specification, and to fully establish the state of the art in certain areas of technology, Applicant(s) herein expressly incorporate(s) by reference all of the following materials identified in each numbered paragraph below.

U.S. Pat. No. 3,880,047 discloses a hold-down and chip removal device for attachment to router machines. The device has a vacuum housing which attaches around the spindle housing of a router and surrounds the cutter locked in the spindle. The housing has an aperture in its lower surface through which the cutter extends. Attached around the periphery of this aperture is a hold-down and sealing brush. The vacuum housing is connected to a vacuum source so that, when the cutter is in the operational mode, the brush contacts the workpiece and establishes a vacuum chamber within the housing to promote chip removal. The brush also holds down the workpiece which is only laterally registered on the working surface of the machine.

U.S. Publication No. 20130192645 discloses an apparatus for cleaning a collection system of debris is shown and described. The apparatus may include a debris collector having a capacity and an inlet hose operatively coupled with the debris collector, at least a portion of the inlet hose positionable within the collection system. The apparatus may also include at least one vacuum operatively coupled with the debris collector, where the vacuum creates suction capable of forcing debris and fluid from the collection system into the inlet hose, and a debris reduction assembly attached to the inlet hose, where the debris reduction assembly is capable of generally reducing a size of the debris entering the inlet hose.

U.S. Pat. No. 5,985,158 discloses a debris trap assembly for use with downspouts connected to a rain gutter system. The debris trap assembly replaces the portion of the downspout from about waist height down to the drain tile connection. Rain water is carried by the downspout to the debris trap assembly where it flows through a strainer housing containing a strainer cup. The strainer cup accumulates the debris collected by the rain gutters and flushed down the downspout by the rain water. The strainer cup has a special shape that allows it to occupy nearly all the space in the housing while still being removable through an access opening to empty the debris from the cup. An indicator built into the strainer cup displays when the strainer cup needs to be emptied. To empty the strainer cup, it is first removed from the housing and then dumped in either the garbage or a compost pile. The strainer cut is then easily replaced into the strainer housing. In the event that the strainer cup is not emptied when full, a set of emergency drains conducts the rain water out of the debris trap assembly and directs it to the ground and away from the building.

U.S. Publication No. 20180117723 discloses a dust and debris extraction device for the purpose of capturing dust and debris created by a chisel held by a power tool has an opening for a chisel to pass through at the front and is guided upward by a sleeve that passes out the top of the body of the device. The extraction end of the device has a locking mechanism to keep a hose going to a negative air source attached. The dust and debris extraction device may either free float on the shank of the chisel or be fixed to the power tool with a bracket.

Applicant(s) believe(s) that the material incorporated above is "non-essential" in accordance with 37 CFR 1.57, because it is referred to for purposes of indicating the background of the invention or illustrating the state of the art. However, if the Examiner believes that any of the above-incorporated material constitutes "essential material" within the meaning of 37 CFR 1.57(c)(1)-(3), Applicant(s) will amend the specification to expressly recite the essential material that is incorporated by reference as allowed by the applicable rules.

SUMMARY

The present invention provides among other things methods and devices relating to loose debris chip shielding for tile removal projects. A mobile arm with a shield at one end, a clasp to a chipping hammer, chipping hammer accessory, or vacuum cuff at the other end, and several degrees of freedom for motion allow the device to cover an area over a chipping hammer blade to block flying debris chips. Before the present invention, workers had to cover this area with their hands. The degrees of freedom are created by rotatable elbow joints where the mobile arm meets the shield and where the mobile arm meets the clasp, as well as a looseness of the coupling between the clasp and the chipping hammer, chipping hammer accessory, or vacuum cuff. The shield has a hollow interior that the chipping hammer blade passes through, partially enclosing it.

In one embodiment, a clasp also has a locking mechanism configured to lock to a chipping hammer, chipping hammer accessory, or vacuum cuff to restrict it from rotating freely about the chipping hammer, chipping hammer accessory, or vacuum cuff.

In one embodiment, a clasp has a protruding ledge and a chipping hammer, chipping hammer accessory, or vacuum cuff has a gap of the right size and shape for the protruding ledge to fit in the gap. The sides of the gap partially restrict the clasp from rotating freely about the chipping hammer, chipping hammer accessory, or vacuum cuff.

In one embodiment, a clasp has a protruding ledge and a chipping hammer, chipping hammer accessory, or vacuum cuff has partner protruding ledges of the right size and shape for the protruding ledge to fit between the partner protruding ledges. The partner protruding ledges partially restrict the clasp from rotating freely about the chipping hammer, chipping hammer accessory, or vacuum cuff.

In one embodiment, a clasp slideably couples to a chipping hammer, chipping hammer accessory, or vacuum cuff.

In one embodiment, a lip or other barrier on a chipping hammer, chipping hammer accessory, or vacuum cuff restricts a clasp's movement.

In one embodiment, a mobile arm has one or more locking pins near the clasp.

In one embodiment, a clasp has one or more locking pin docks.

In one embodiment, a loose debris chip shield is manufactured by coupling a mobile arm to a shield at one end by a first rotatable elbow joint and coupling the mobile arm to a clasp by a second rotatable elbow joint at the other end.

In one embodiment, a loose debris chip shield is manufactured by locking a clasp to a chipping hammer, chipping hammer accessory, or vacuum cuff.

In one embodiment, a loose debris chip shield is manufactured by shaping a protruding ledge on a clasp that fits within a gap on the chipping hammer, chipping hammer accessory, or vacuum cuff.

In one embodiment, a loose debris chip shield is manufactured by shaping a protruding ledge on the clasp that fits within partner protruding ledges on a chipping hammer, chipping hammer accessory, or vacuum cuff.

In one embodiment, a loose debris chip shield is manufactured by slideably coupling a clasp to a chipping hammer, chipping hammer accessory, or vacuum cuff.

In one embodiment, a loose debris chip shield is manufactured by slideably coupling a clasp to a chipping hammer, chipping hammer accessory, or vacuum cuff with a lip or other barrier restricting the movement of the clasp.

In one embodiment, a loose debris chip shield is manufactured by coupling one or more locking pins on a mobile arm near a clasp to one or more locking pin docks on the clasp.

In one embodiment, an individual is protected from loose debris chips by covering a blade of a chipping hammer with a shield with a hollow interior that a blade of the chipping hammer can pass through and moving the shield in response to vibration from a chipping hammer, chipping hammer accessory, vacuum cuff or debris chips so that a majority of the debris chips are deflected by the moving shield.

In one embodiment, an individual is protected from loose debris chips by coupling a clasp to a chipping hammer, chipping hammer accessory, or vacuum cuff.

In one embodiment, an individual is protected from loose debris chips by slideably coupling a clasp to a chipping hammer, chipping hammer accessory, or vacuum cuff.

In one embodiment, an individual is protected from loose debris chips by locking a mobile arm in place while not in use by locking one or more locking pins into one or more locking pin docks, and unlocking the locking pins from the locking pin docks to use the mobile arm again.

Aspects and applications of the invention presented here are described below in the drawings and detailed description of the invention. Unless specifically noted, it is intended that the words and phrases in the specification and the claims be given their plain, ordinary, and accustomed meaning to those of ordinary skill in the applicable arts. The inventor is fully aware that he can be his own lexicographer if desired. The inventor expressly elects, as his own lexicographers, to use only the plain and ordinary meaning of terms in the specification and claims unless he clearly states otherwise and then further, expressly sets forth the "special" definition of that term and explains how it differs from the plain and ordinary meaning. Absent such clear statements of intent to apply a "special" definition, it is the inventor's intent and desire that the simple, plain and ordinary meaning to the terms be applied to the interpretation of the specification and claims.

The inventor is also aware of the normal precepts of English grammar. Thus, if a noun, term, or phrase is intended to be further characterized, specified, or narrowed in some way, then such noun, term, or phrase will expressly include additional adjectives, descriptive terms, or other modifiers in accordance with the normal precepts of English grammar. Absent the use of such adjectives, descriptive terms, or modifiers, it is the intent that such nouns, terms, or phrases be given their plain, and ordinary English meaning to those skilled in the applicable arts as set forth above.

Further, the inventor is fully informed of the standards and application of the special provisions of 35 U.S.C. § 112(f). Thus, the use of the words "function," "means" or "step" in the Detailed Description or Description of the Drawings or claims is not intended to somehow indicate a desire to invoke the special provisions of 35 U.S.C. § 112(f), to define the invention. To the contrary, if the provisions of 35 U.S.C. § 112(f) are sought to be invoked to define the inventions, the claims will specifically and expressly state the exact phrases "means for" or "step for, and will also recite the word "function" (i.e., will state "means for performing the function of insert function"), without also reciting in such phrases any structure, material or act in support of the function. Thus, even when the claims recite a "means for performing the function of . . . " or "step for performing the function of . . . ," if the claims also recite any structure, material or acts in support of that means or step, or that perform the recited function, then it is the clear intention of the inventor not to invoke the provisions of 35 U.S.C. § 112(f). Moreover, even if the provisions of 35 U.S.C. § 112(f) are invoked to define the claimed inventions, it is intended that the inventions not be limited only to the specific structure, material or acts that are described in the preferred embodiments, but in addition, include any and all structures, materials or acts that perform the claimed function as described in alternative embodiments or forms of the invention, or that are well known present or later-developed, equivalent structures, material or acts for performing the claimed function.

The foregoing and other aspects, features, and advantages will be apparent to those artisans of ordinary skill in the art from the DETAILED DESCRIPTION and DRAWINGS, and from the CLAIMS.

BRIEF DESCRIPTION OF THE SEVERAL VIEWS OF THE DRAWINGS

A more complete understanding of the present invention may be derived by referring to the detailed description when considered in connection with the following illustrative figures. In the figures, like reference numbers refer to like elements or acts throughout the figures.

Elements and acts in the figures are illustrated for simplicity and have not necessarily been rendered according to any particular sequence or embodiment.

DETAILED DESCRIPTION

In the following description, and for the purposes of explanation, numerous specific details are set forth in order to provide a thorough understanding of the various aspects of the invention. It will be understood, however, by those skilled in the relevant arts, that the present invention may be practiced without these specific details. In other instances, known structures and devices are shown or discussed more generally in order to avoid obscuring the invention. In many cases, a description of the operation is sufficient to enable one to implement the various forms of the invention, particularly when the operation is to be implemented in software. It should be noted that there are many different and alternative configurations, devices and technologies to which the disclosed inventions may be applied. The full scope of the inventions is not limited to the examples that are described below.

The present invention may perform the role of blocking flying debris chips. Utilizing the present invention workers no longer need to cover an area over the chipping hammer blade with their hands.

In one application, the inventions herein are used to control the flying debris chips by deflecting the majority of them back down towards the ground. This is done with a shield 300 with a hollow interior 420, which shields an area above and around a chipping hammer blade 520 and a distal end of the chipping hammer blade 550. When the chipping hammer 510 is in operation and flying debris chips launch upward into the air, the shield deflects these flying debris chips back down to the ground. In one embodiment, the shield 300 is both longer and wider than the chipping hammer blade 520, and curves downward but still around the distal end of the chipping hammer blade 550 at the front end furthest from the chipping hammer 510 as well as the two sides substantially perpendicular to this front end. By not curving the shield 300 downward at the back end closest to the chipping hammer 510, the chipping hammer blade 520 is not blocked and is able to pass therethrough.

When the chipping hammer 510 is in operation and flying debris chips launch upward into the air, the shield deflects these flying debris chips back down to the ground. As debris chips are sent up in various directions during chipping hammer 510 use, this shield 300 with a hollow interior 420 blocks the debris chips flying in several directions.

A valuable aspect of the inventions is the mobility of the shield 300, which has several degrees of freedom providing mobility. These different degrees of freedom arise out of the inventions' structures. Several degrees of freedom allow the loose debris chip shield 010 great mobility in operation so that the shield 300 is able to move around and block the loose debris chips without hindering the worker by blocking the chipping hammer blade 520 or otherwise getting in the way or requiring additional movement aside from its free movement along the degrees of freedom.

In the exemplary embodiments illustrated by FIGS. 1, 2, 3, 4, 5A, 5B, 6, and 8, the shield 300 is coupled to a mobile arm 200 by a second hinge 310. In other exemplary embodiments, the second hinge 310 can be any second rotatable elbow joint 312 that allows the shield 300 to rotate around the joint. This is a first degree of freedom.

The mobile arm 200 covers a distance from a distal end of a chipping hammer blade 550 to the point at which the loose debris chip shield 010 couples to a chipping hammer, chipping hammer accessory, or vacuum cuff 510. In the exemplary embodiments illustrated by the figures, the mobile arm 200 couples to a clasp 100 by a first hinge 110. In other exemplary embodiments, the first hinge 110 can be any first rotatable elbow joint 112 that allows the mobile arm 200 to rotate around the joint. This is a second degree of freedom.

In the exemplary embodiments illustrated by FIGS. 1, 2, 3, 4, 5A, 5B, 6, and 8, the clasp 100 is removably coupled to a vacuum cuff. The clasp 100 is shaped as a loop, and the vacuum cuff inserts through the opening in the loop and couples to a chipping hammer or chipping hammer accessory 510. In other exemplary embodiments, the clasp 100 can couple to the vacuum cuff through a variety of mechanical couplings or the clasp 100 can couple to a chipping hammer or chipping hammer accessory 510.

The coupling between the clasp 100 and the chipping hammer, chipping hammer accessory, or vacuum cuff 510 is loose enough so that the clasp 100 may slide up and down along the point where it is coupled. This is a third degree of freedom. The amount the clasp 100 is able to slide is restricted by a lip or other barrier 530 on a chipping hammer, chipping hammer accessory, or vacuum cuff 510 above the point where the clasp 100 is coupled. Furthermore, the clasp 100 is coupled loosely enough so that it may rotate around the coupling point. In the exemplary embodiments illustrated by the figures, the clasp 100 rotates around a vacuum cuff, which it is also able to slide up and down on because the clasp is coupled loosely. This is a fourth degree of freedom.

In the exemplary embodiments illustrated by the figures, the amount the clasp 100 is able to rotate is restricted by a slab 410 extending outward on the back of the clasp that fits in a gap between two partner slabs 540 on a chipping hammer, chipping hammer accessory, or vacuum cuff 510.

In the exemplary embodiments illustrated by FIGS. 1, 2, 3, 4, 5A, 5B, 6, and 8 the clasp 100 has a gap that has a larger diameter than the diameter of the vacuum cuff it is looped around. This slight mismatch in size also allows the clasp to tilt, wiggle, jiggle, wriggle or any other sort of small movement loosely about the vacuum cuff. This is a fifth degree of freedom.

When a chipping hammer 510 is in operation, there is a mechanical vibration force that distributes along the device so that the chipping hammer blade 520 has the force to break apart and dislocate tiles affixed to a floor, wall, or other surface. These degrees of freedom in the inventions allow it to be freely moved by the mechanical vibration force that transfers from the chipping hammer 510 to the loose debris chip shield 010. It is this dynamic movement in response to the chipping hammer 510 vibration that allows the shield 300 to block a majority of the flying debris chips without interfering with them operation of the chipping hammer 510.

Figure 1:
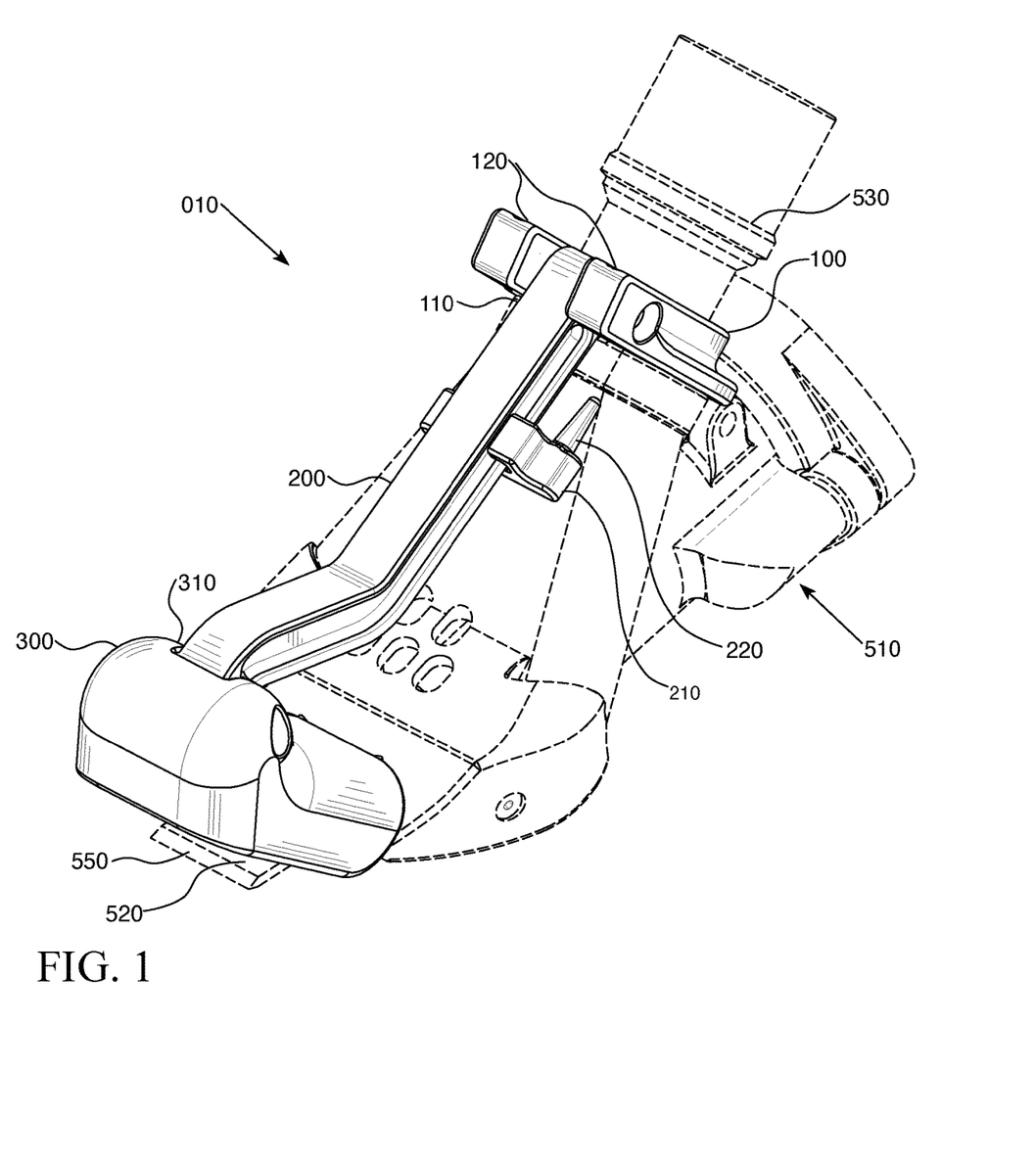
FIG. 1 depicts an exemplary embodiment of a loose debris chip shield at an isometric perspective, where the loose debris chip shield is coupled by the clasp to a chipping hammer by the vacuum cuff. The chipping hammer and vacuum cuff are marked out and present for clarifying the invention's context.
Figures 2, 3:
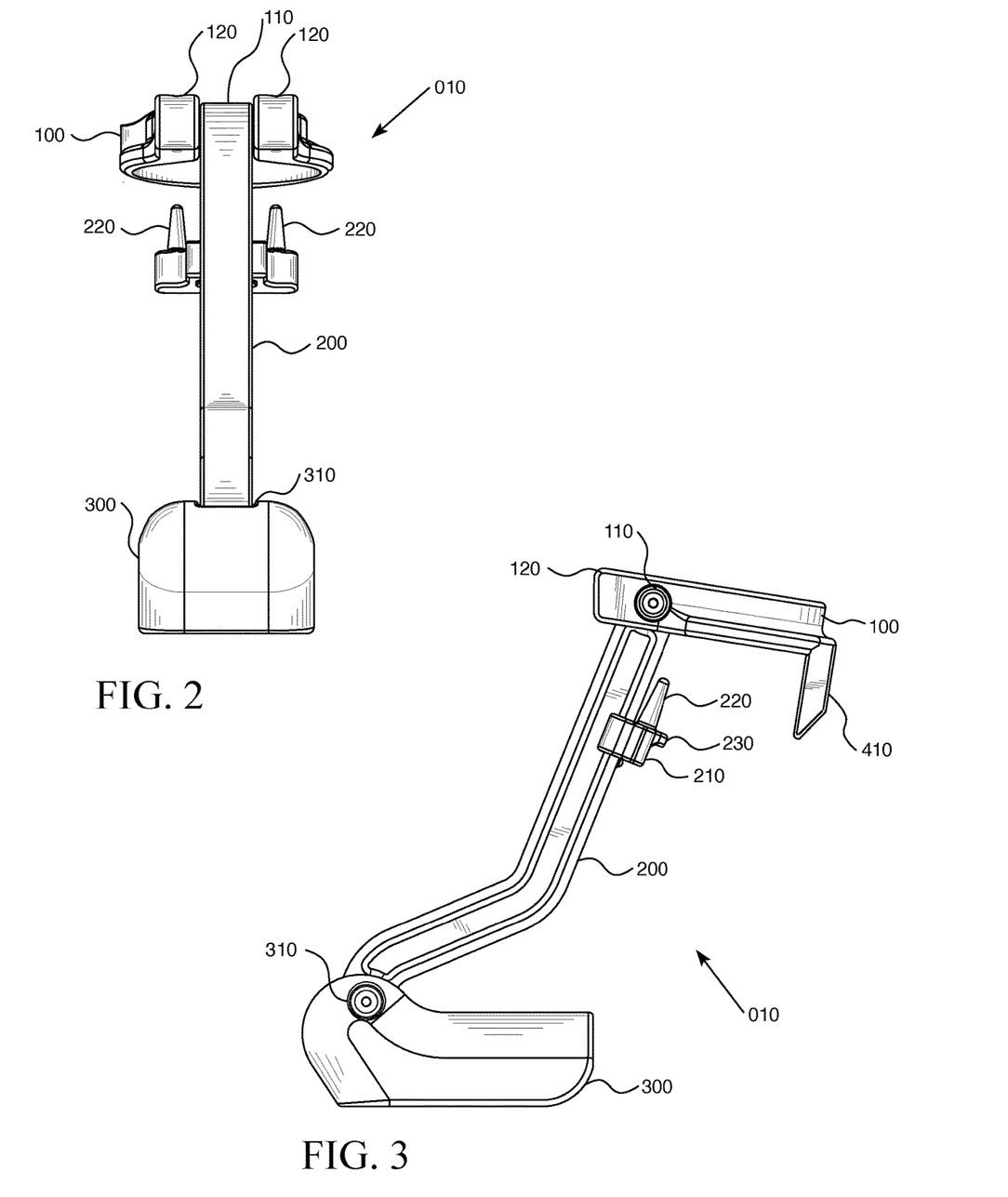
FIG. 2 depicts an exemplary embodiment of a loose debris chip shield at a front perspective.
FIG. 3 depicts an exemplary embodiment of a loose debris chip shield at a side perspective.
Figure 4:
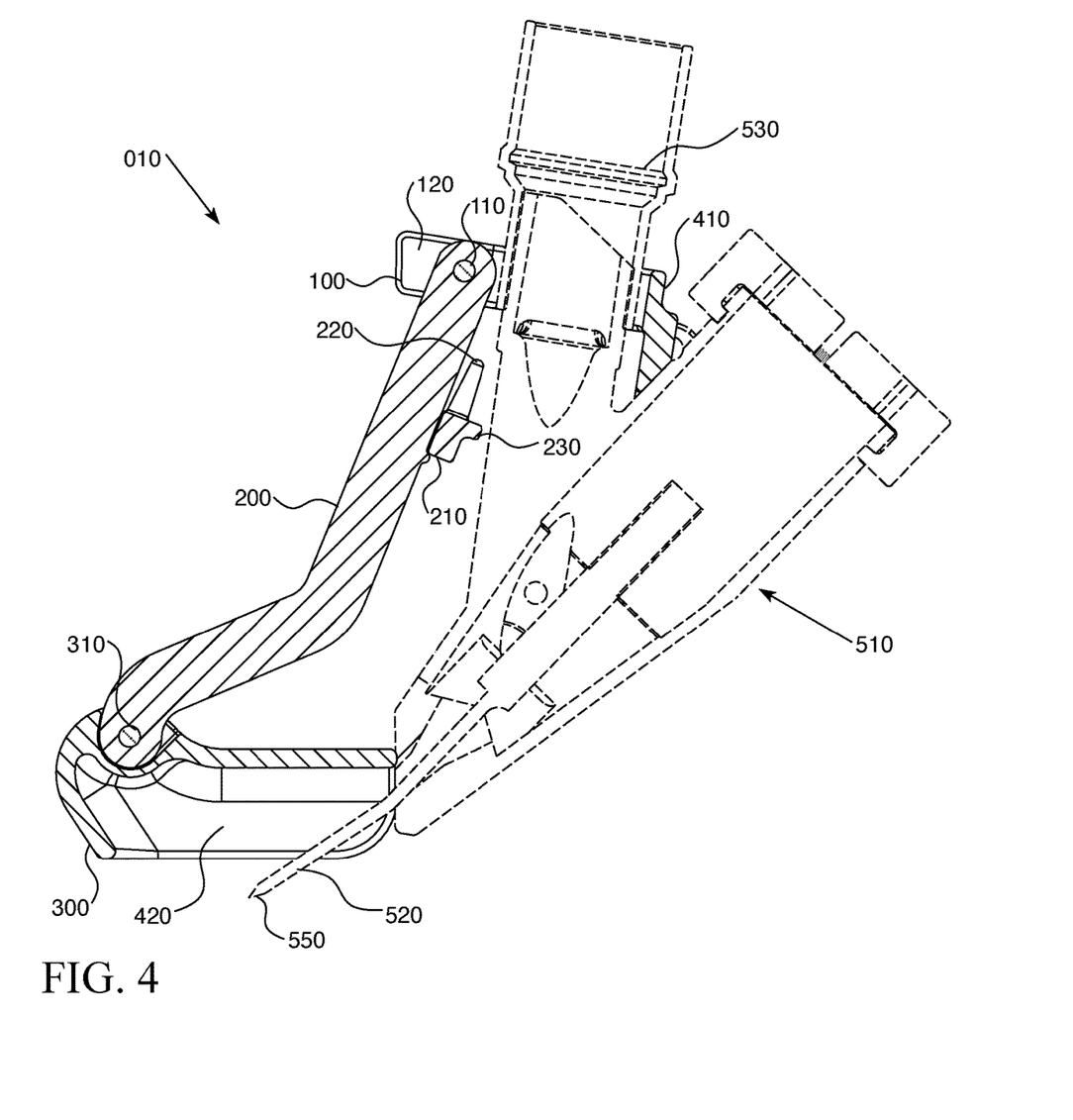
FIG. 4 depicts an exemplary embodiment of a loose debris chip shield at a side perspective, where the loose debris chip shield is coupled by the clasp to a chipping hammer by the vacuum cuff. The chipping hammer and vacuum cuff are marked out and present for clarifying the invention's context.
Figure 5A:
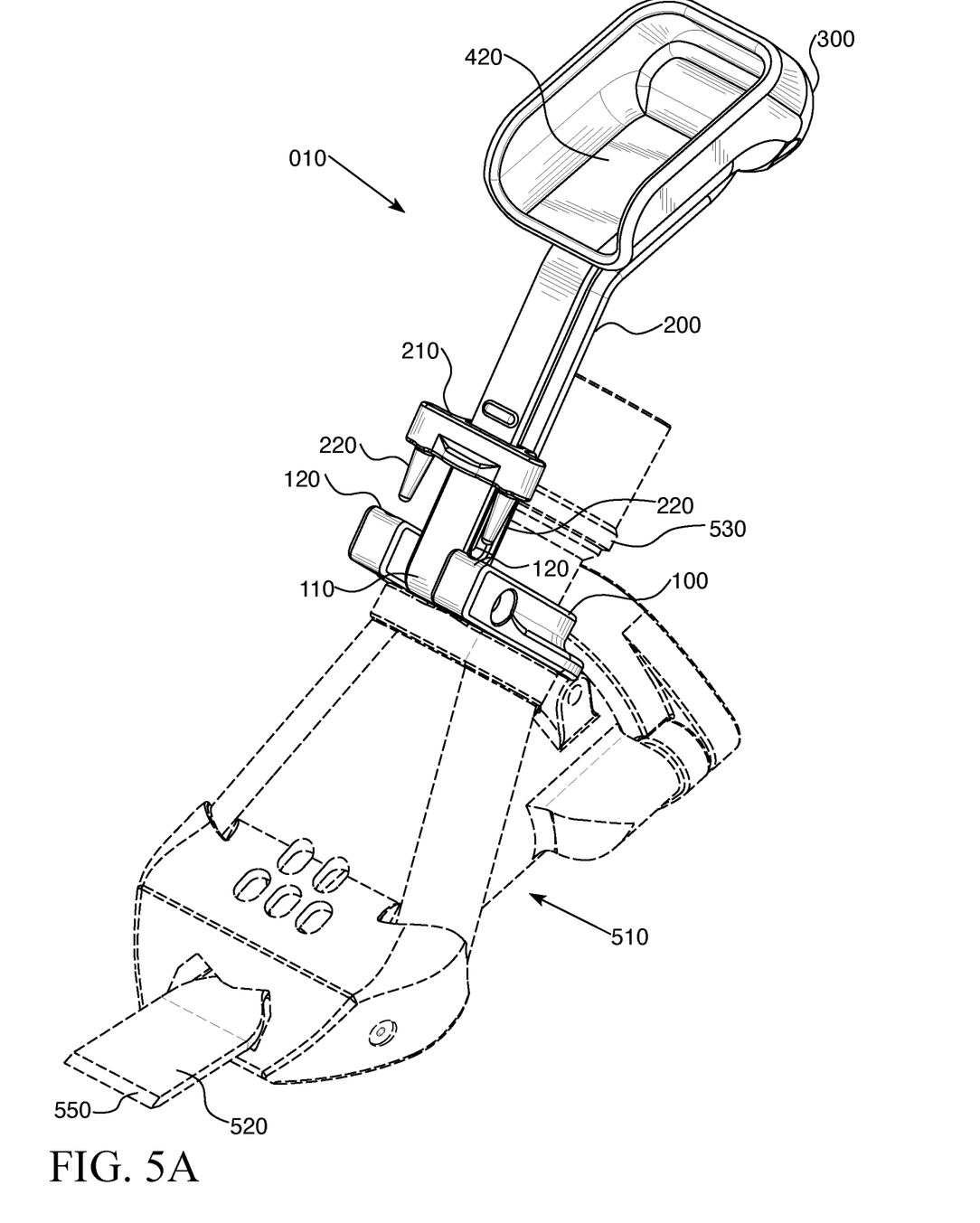
FIG. 5A depicts an exemplary embodiment of a loose debris chip shield at an isometric perspective, where the loose debris chip shield is raised in an upright position compared to FIG. 1 and the locking mechanism is disengaged. The loose debris chip shield is coupled by the clasp to a chipping hammer by the vacuum cuff, and the chipping hammer and vacuum cuff are marked out and present for clarifying the invention's context.
Figure 5B:
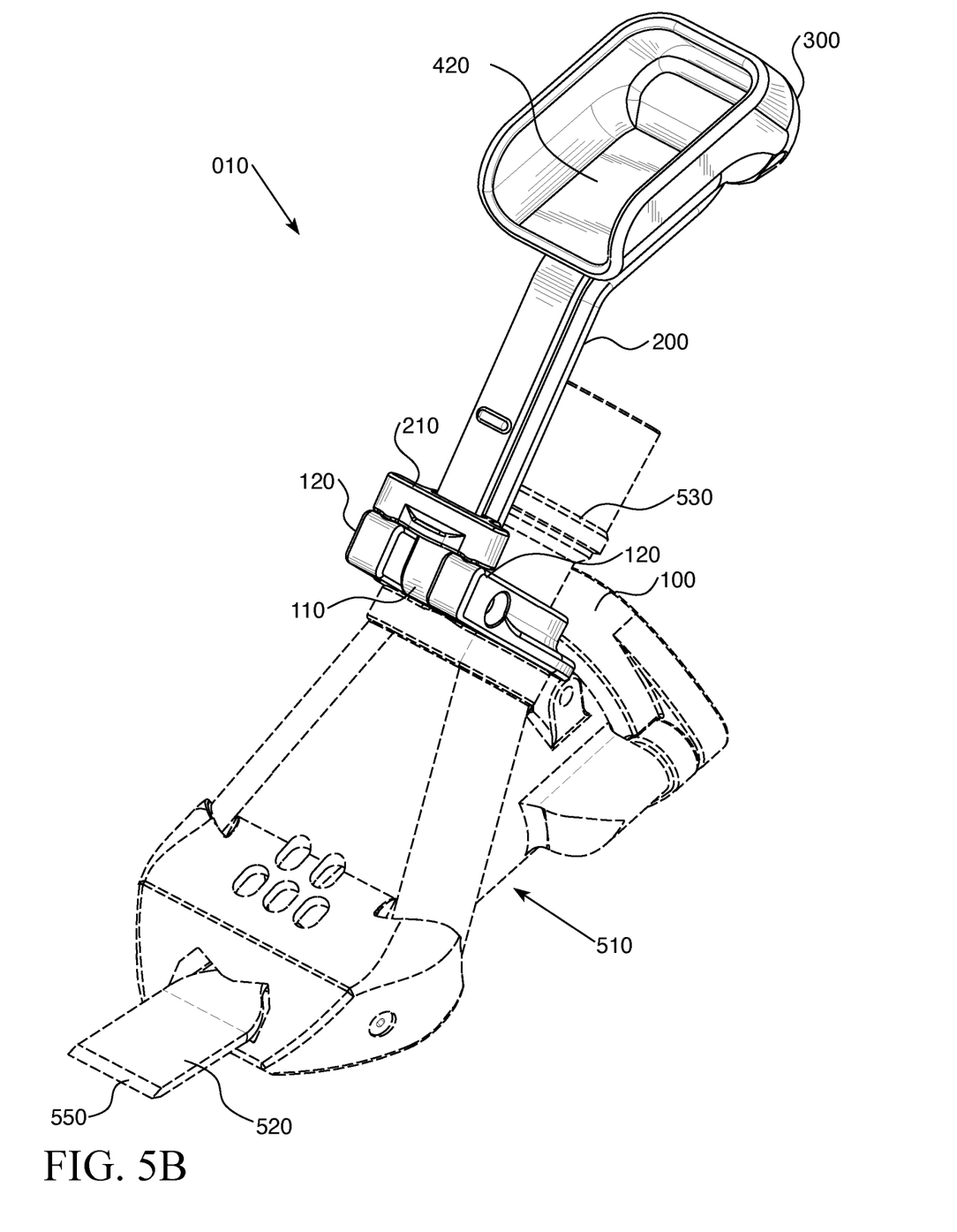
FIG. 5B depicts an exemplary embodiment of a loose debris chip shield at an isometric perspective, where the loose debris chip shield is raised in an upright position compared to FIG. 1 and the locking mechanism is engaged. The loose debris chip shield is coupled by the clasp to a chipping hammer by the vacuum cuff, and the chipping hammer and vacuum cuff are marked out and present for clarifying the invention's context.
Figure 6:
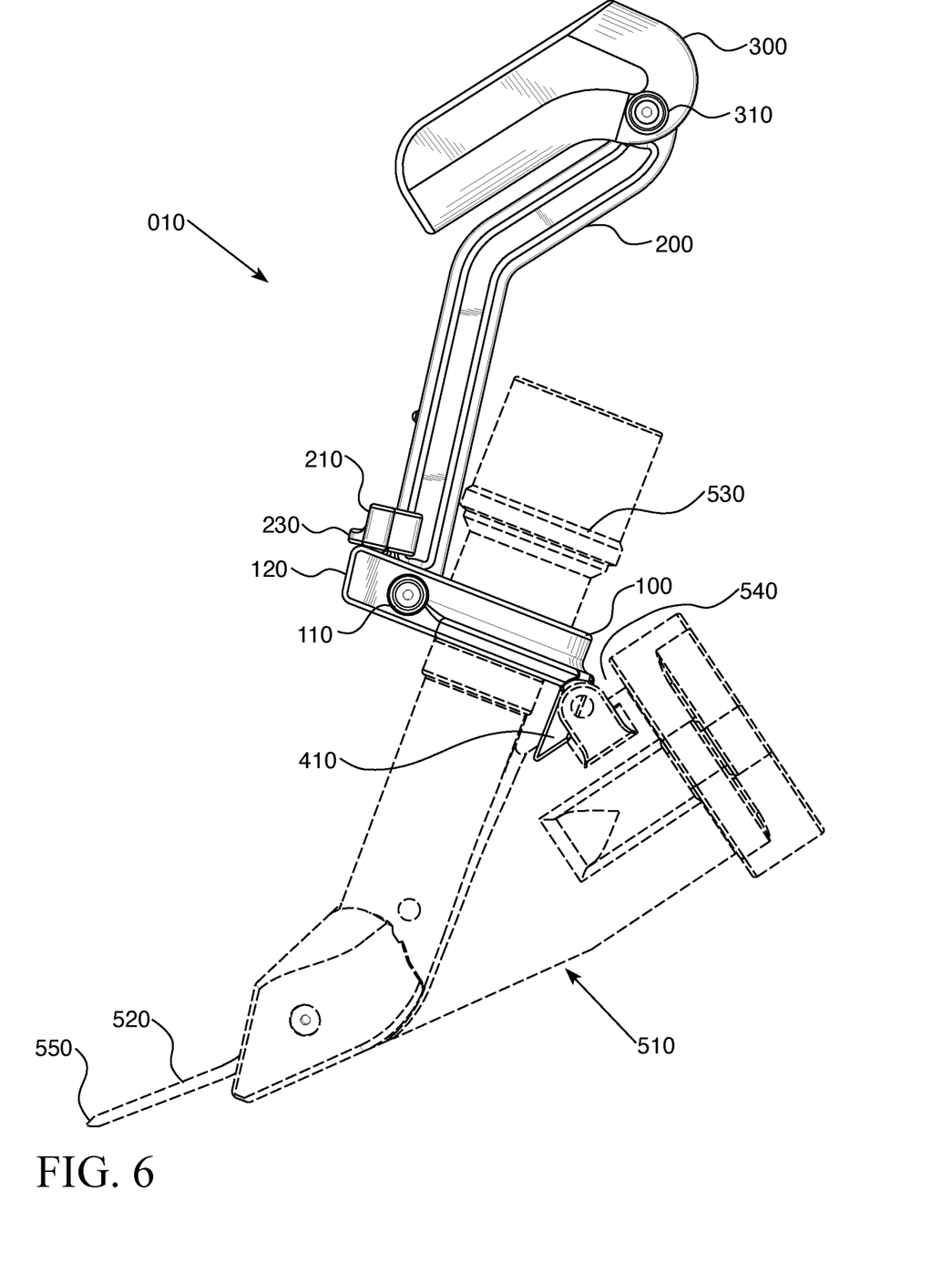
FIG. 6 depicts the exemplary embodiment of a loose debris chip shield at a side perspective while the loose debris chip shield is in an upright and locked position. The loose debris chip shield is coupled by the clasp to a chipping hammer by the vacuum cuff, and the chipping hammer and vacuum cuff are marked out and present for clarifying the invention's context.

The shield 300 has a hollow interior 420, visible in FIGS. 4, 5A, and 5B. This hollow 420 interior allows the blade 520 of the chipping hammer 510 to pass through it. This hollow interior 420 is configured such that the shield is able to cover the area where debris chips fly without interfering with the operation of the chipping hammer 510.

Figure 7A:
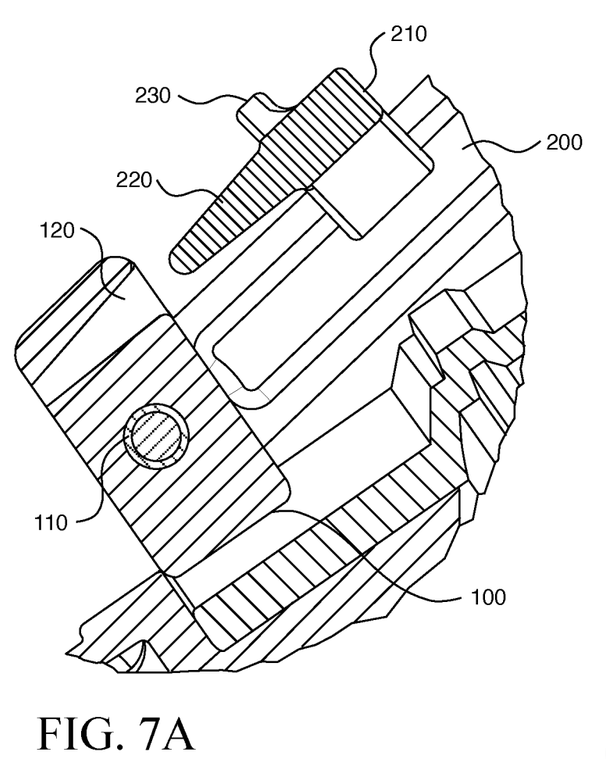
FIG. 7A depicts a zoomed in view of a locking mechanism in an exemplary embodiment, wherein the lock is disengaged.
Figure 7B:
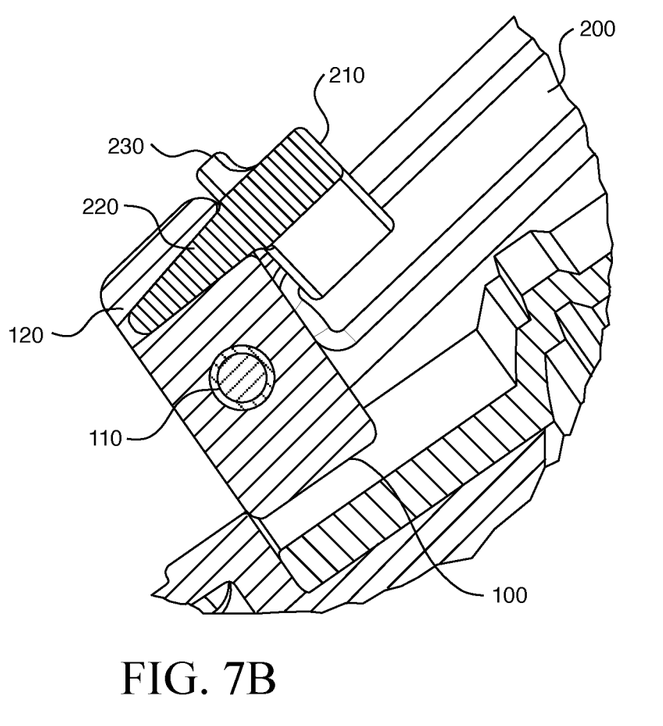
FIG. 7B depicts a zoomed in view of a locking mechanism in an exemplary embodiment, wherein the lock is engaged.
Figure 8:
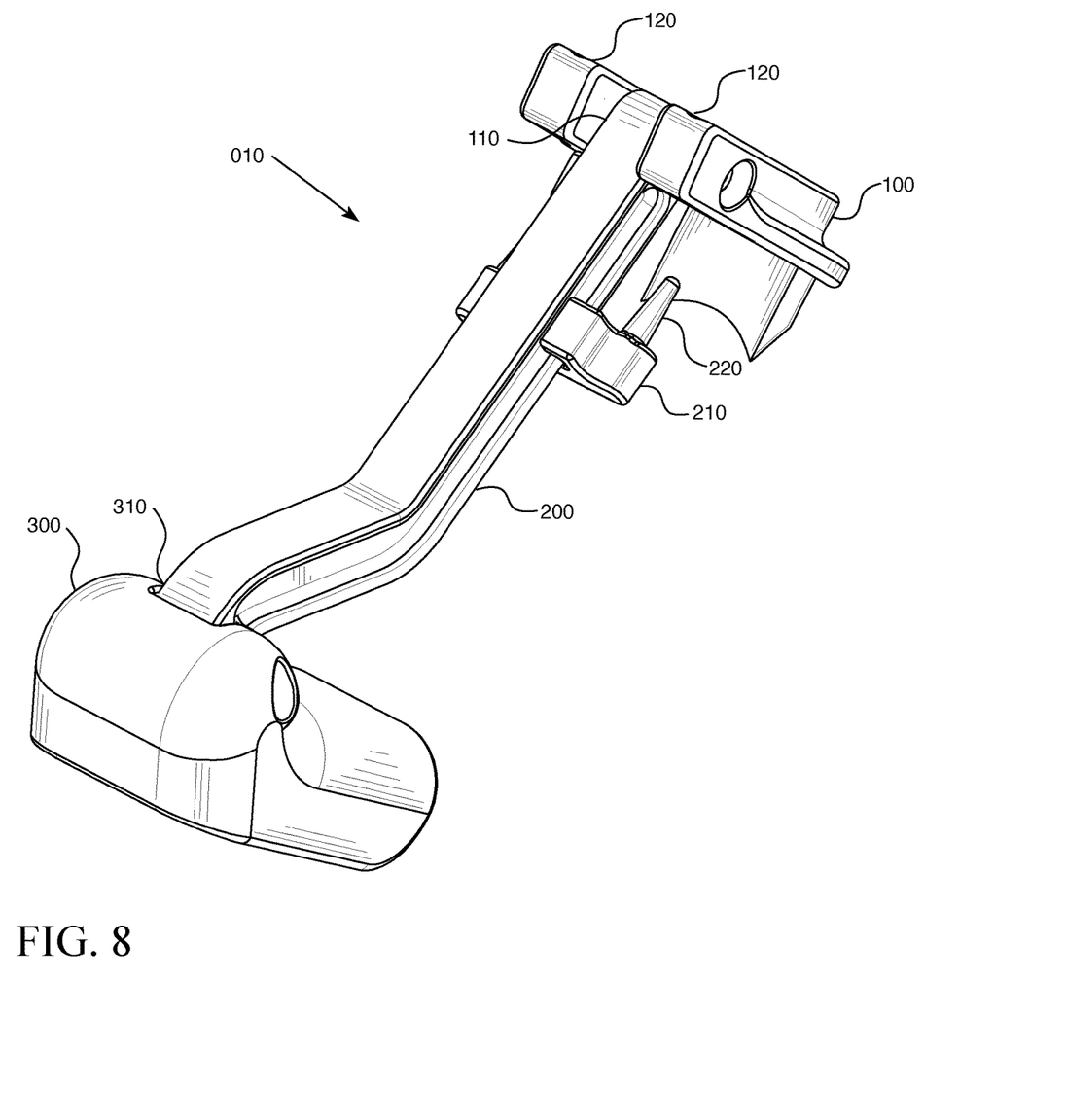
FIG. 8 depicts an exemplary embodiment of a loose debris chip shield at an isometric perspective.

In some embodiments, the invention also comprises a locking mechanism to fix the loose chip shield 010 in place away from the chipping hammer blade 520 so that a worker may clean or repair the blade without the loose chip shield 010 being in the way. This locking mechanism is best illustrated in FIG. 7A and FIG. 7B. The locking mechanism comprises one or more locking pins 220 on a moveable locking pin station 210, where the locking pins 220 lock into a matching set of locking pin docks 120. In some embodiments, the locking pin station 210 slides up and down a groove on the sides of the mobile arm 200. In some embodiments, the locking pin station 210 is moved by pushing or pulling a tab 230 that protrudes from or is indented into the locking pin station 210.

In some embodiments, the locking pin station may move along one side of the mobile arm by a tab that fits into gaps along the mobile arm; along a belt inside the mobile arm; or a variety of other mechanisms to move the locking pin station toward or away locking pin docks 120. In some embodiments the locking pin station 210 itself is fixed, while the locking pins 220 themselves move toward or away from their locking pin docks 120, such as by a slideable coupling to the locking pin station 210 or a spring loaded mechanism within the locking pin station 210.

I claim:
1. A loose debris chip shield comprising:
a mobile arm comprising:
a first rotatable elbow joint at a first end configured to allow the mobile arm to move about the first rotatable elbow joint; and
a second rotatable elbow joint at a second end configured to allow the mobile arm to move about the second rotatable elbow joint;
a clasp coupled to the first rotatable elbow joint at the first end of the mobile arm and configured to couple to a chipping hammer, wherein:
the coupling between the clasp and the chipping hammer is sufficiently loose such that the clasp is slidable along a length of the chipping hammer to which it is coupled;
the clasp is rotatably coupled around the coupling point; and
the clasp is coupled to a locking mechanism comprising a plurality of locking pin docks proximal to the first joint such that:
when a pin within each locking pin dock is loosened, the clasp is movable with respect to the locking dock during operation of the chipping hammer; and
when a pin within each locking pin dock is tightened, the clasp is locked into position such that the loose debris chip shield is positioned away from a blade of the chipping hammer; and
a shield coupled to the second joint at the second end of the mobile arm wherein the shield is configured to rest on a tiled surface and further comprises:
a hollow interior configured to pass a blade of the chipping hammer therethrough so that the shield is able to cover the area where debris chips fly without interfering with the operation of the chipping hammer.

2. The loose debris chip shield of claim 1 wherein the locking mechanism is further configured to lock to the chipping hammer such that the clasp is restricted from rotational movement about the chipping hammer.

3. The loose debris chip shield of claim 1 wherein the clasp further comprises a protruding ledge configured to fit within a gap on the chipping hammer such that the gap's sides partially restrict rotational movement of the clasp about the chipping hammer.

4. The loose debris chip shield of claim 1 wherein the clasp further comprises a protruding ledge configured to fit between partner protruding ledges on the chipping hammer such that the partner protruding ledges partially restrict rotational movement of the clasp about the chipping hammer.

5. The loose debris chip shield of claim 1, wherein the clasp movement is restricted by a lip or other barrier on the chipping hammer.

6. A method of manufacturing a loose debris chip shield comprising:
coupling a mobile arm to a first rotatable elbow joint at a first end configured to allow the mobile arm to move about the first joint;
coupling the mobile arm to a second rotatable elbow joint at a second end configured to allow the mobile arm to move about the second joint;
coupling the second joint at the second end to a shield;
coupling the first joint at the first end to a clasp configured to couple to a chipping hammer, wherein:
the coupling between the clasp and the chipping hammer is sufficiently loose such that the clasp is slidable along a length of the chipping hammer to which it is coupled;

the clasp is rotatably coupled around the coupling point; and the clasp is coupled to a locking mechanism comprising a plurality of locking pin docks proximal to the first joint such that:

when a pin within each locking pin dock is loosened, the clasp is movable with respect to the locking dock during operation of the chipping hammer; and when a pin within each locking pin dock is tightened, the clasp is locked into position such that the loose debris chip shield is positioned away from a blade of the chipping hammer; and shaping the shield so that it comprises a hollow interior configured to rest on a tiled surface and to pass the blade of the chipping hammer therethrough so that the shield is able to cover the area where debris chips fly without interfering with the operation of the chipping hammer.

7. The method of manufacturing a loose debris chip shield of claim 6 wherein the method further comprises locking the clasp to the chipping hammer such the clasp is restricted from rotational movement about the chipping hammer.

8. The method of manufacturing a loose debris chip shield of claim 6 wherein the method further comprises shaping a protruding ledge on the clasp configured to fit within a gap on the chipping hammer such that the gap's sides partially restrict rotational movement of the clasp about the chipping hammer.

9. The method of manufacturing a loose debris chip shield of claim 6 wherein the method further comprises shaping a protruding ledge on the clasp configured to fit between partner protruding ledges on the chipping hammer such that the two partner protruding ledges partially restrict rotational movement of the clasp about the chipping hammer.

10. The method of manufacturing a loose debris chip shield of claim 6 wherein the method further comprises slideably coupling the clasp to the chipping hammer.

11. The method of manufacturing a loose debris chip shield of claim 6 wherein the method further comprises slideably coupling the clasp to a chipping hammer both so that the clasp may slide up and down along the chipping hammer and the clasp's movement sliding up and down along the chipping hammer is limited by a lip or other barrier on the chipping hammer.

12. The method of manufacturing a loose debris chip shield of claim 6 wherein the method further comprises coupling a plurality of locking pins on the mobile arm at a position proximal to the clasp to a plurality of locking pin docks coupled to the clasp proximal to the first joint.

* * * * *